US009983602B2

United States Patent
Raja et al.

(10) Patent No.: US 9,983,602 B2
(45) Date of Patent: May 29, 2018

(54) EFFICIENT VOLTAGE SENSING SYSTEMS AND METHODS

(71) Applicant: NVIDIA Corporation, Santa Clara, CA (US)

(72) Inventors: Tezaswi Raja, San Jose, CA (US); Sagheer Ahmad, Cupertino, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 30 days.

(21) Appl. No.: 13/731,937

(22) Filed: Dec. 31, 2012

(65) Prior Publication Data

US 2014/0184179 A1 Jul. 3, 2014

(51) Int. Cl.
  *G05F 1/10* (2006.01)
  *G01R 19/00* (2006.01)
  *G06F 1/26* (2006.01)

(52) U.S. Cl.
  CPC . *G05F 1/10* (2013.01); *G06F 1/26* (2013.01)

(58) Field of Classification Search
  CPC .... H02M 3/1588; H02M 3/156; H02M 3/158; H02M 3/1582; Y02B 70/1466; G05F 1/10
  See application file for complete search history.

(56) References Cited

U.S. PATENT DOCUMENTS

| | | | |
|---|---|---|---|
| 2,800,621 A * | 7/1957 | Carlson et al. | 363/84 |
| 5,737,197 A * | 4/1998 | Krichtafovitch | B03C 3/68 363/17 |
| 6,909,266 B2 * | 6/2005 | Kernahan et al. | 323/282 |
| 7,138,815 B1 | 11/2006 | Alexander et al. | |
| 7,849,332 B1 * | 12/2010 | Alben et al. | 713/300 |
| 2004/0095119 A1 | 5/2004 | Kernahan et al. | |
| 2004/0222810 A1 | 11/2004 | Frankowsky et al. | |
| 2006/0170402 A1 * | 8/2006 | Banerjee et al. | 323/273 |
| 2008/0247241 A1 * | 10/2008 | Nguyen et al. | 365/185.22 |

(Continued)

FOREIGN PATENT DOCUMENTS

| | | |
|---|---|---|
| CN | 1523368 | 8/2004 |
| CN | 201697957 | 1/2011 |

OTHER PUBLICATIONS

Herzer, et al.; Capacitive-Coupled Current Sensing and Auto-Ranging Slope Compensation for Current Mode SMPS With Wide Supply and Frequesncy Range; IEEE; ESSCIRC; Sep. 2009; pp. 140-143; Texas Instruments; Freising, Germany.

*Primary Examiner* — Nguyen Tran
*Assistant Examiner* — Monica Mata

(57) ABSTRACT

Presented systems and methods can facilitate efficient voltage sensing and regulation. In one embodiment, a presented multiple point voltage sensing system includes Multiple point voltage sensing. Multi-point sensing is the scheme where voltage feedback from Silicon to the voltage regulator is an average from multiple points on the die. In one embodiment, multi-point sensing is done by placing multiple sense points across the partition/silicon and merging the sense traces from each sense point with balanced routing. In one embodiment, a presented multiple point voltage sensing system includes Virtual VDD Sensing with guaranteed non-floating feedback. In one exemplary implementation, Virtual VDD Sensing with guaranteed non-floating feedback allows more accurate sensing when a component is power gated off by removing the sensing results associated with the component.

11 Claims, 8 Drawing Sheets

(56) References Cited

U.S. PATENT DOCUMENTS

| | | | |
|---|---|---|---|
| 2009/0091186 A1* | 4/2009 | Clemo et al. | 307/31 |
| 2012/0025796 A1* | 2/2012 | Kahn | 323/272 |
| 2013/0097450 A1* | 4/2013 | Patel | 713/340 |

* cited by examiner

EFFICIENT VOLTAGE SENSING SYSTEMS AND METHODS

FIELD OF THE INVENTION

The present invention relates to power systems. In particular, the present invention relates to a system and method for system power adjustment (e.g., for improved performance, improved battery life, etc.).

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data in most areas of business, science, education and entertainment. The performance of these activities often involves power consumption. The manner in which power is provided and maintained can have a significant impact on performance and end results. However, traditional attempts at providing appropriate power are often inefficient and inaccurate.

FIG. 1 is an illustration of one embodiment of a conventional power delivery system. The VR (Voltage Regulator) delivers power to the board, then the package and to the transistors in the silicon. Voltage sense is an input to the VR module as shown in FIG. 1. The VR module regulates its voltage output based on the sense feedback. The desired voltage is set by the VR through multi-bits Voltage ID (VID) code. VID is also referred to as Dynamic Voltage Setting (DVS). The VID setting voltage is meant to be the voltage at the sense point, but not at the physical VR module output. The actual voltage at the physical VR module output will be higher than the VID setting. In other words, the IR drop from VR through board, package and silicon power grid/via is attempted to be compensated by the enclosed feedback loop from voltage sensing design. However, in conventional approaches the ability to accurately sense the voltage with appropriate compensation is often difficult and inaccurate.

Some traditional power supply schemes attempt to utilize feedback loops with a single sense point. Convention single sense point approaches are often limited (e.g., "static", etc.) and include a number of inefficient compensations (e.g., an increased voltage noise specification, $2*_{VDC\_VAR}$, etc.). There are often a number of die characteristics that can give rise to a number of problematic issues (e.g., voltage variations across the die, floating point voltage of power gated portions, etc.) in a traditional single sense point approach. Some traditional approaches may attempt to deal with some issues by adding a plurality of additional sense points however these traditional approaches typically require an additional voltage regulator for each additional sense point. Each of the additional voltage regulator is relatively expensive and inefficient (e.g., consumes additional die area and resources, etc.).

SUMMARY

Presented systems and methods can facilitate efficient voltage sensing and regulation. In one embodiment, a presented multiple point voltage sensing system includes multi-point or multiple point voltage sensing. The mutli-point sensing results are combined into a single feedback indication. The combined multi-point sensing single feedback indication can include compensations for a variety of conditions. a variety of compensation In one embodiment, multi-point sensing includes a scheme where voltage feedback from a die to the voltage regulator is an average from multiple sensing points on the die. In one embodiment, multi-point sensing is done by placing multiple sense points across the partition/silicon and merging the sense traces from each sense point with balanced routing. In one embodiment, a presented multiple point voltage sensing system includes Virtual VDD Sensing with non-floating feedback. In one exemplary implementation, Virtual VDD Sensing with non-floating feedback allows more accurate sensing when a component is power gated off by removing the sensing results associated with the component.

DESCRIPTION OF THE DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Presented systems and methods can facilitate efficient voltage sensing and regulation. In one embodiment, a presented multiple point voltage sensing system includes multi-point or multiple point voltage sensing. The multi-point sensing results are combined into a single feedback indication. The combined multi-point sensing single feedback indication can include compensations for a variety of conditions (e.g., location, powergated performance, application, etc.) In one embodiment, multi-point sensing is done by placing multiple sense points across a die (e.g., at various locations of the silicon, at various partitions, at various components, etc.) and merging the sense traces from each sense point with balanced routing. In one embodiment, a presented multiple point voltage sensing system includes Virtual VDD (VVDD) sensing with non-floating feedback. In one embodiment the sensing is guaranteed non-floating feedback. In one exemplary implementation, Virtual VDD Sensing with non-floating feedback allows more accurate sensing when a component is power gated off by removing the sensing results associated with the component.

Figure 2A:
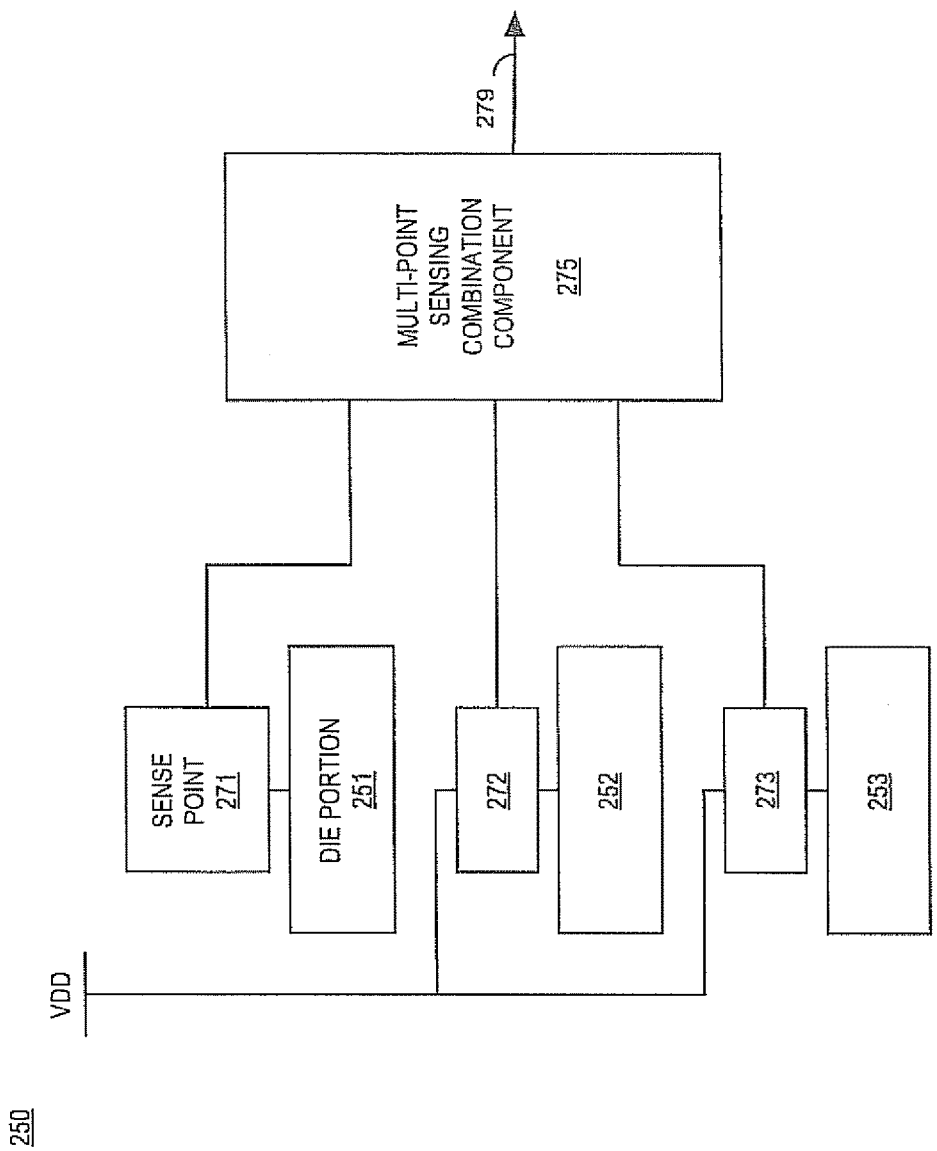
FIG. 2A is a block diagram of an exemplary multiple point voltage sensing system in accordance with one embodiment of the present invention.

FIG. 2A is a block diagram of exemplary multiple point voltage sensing system 250 in accordance with one embodiment of the present invention. Multiple point voltage sensing system 250 includes die portion 251, die portion 252, die portion 253, sense point 271, sense point 272, sense point 273 and multi-point sensing combination component 275. The components of multiple point voltage sensing system 250 cooperatively operate to perform voltage sensing of a die. Portions 251, 252, 253 include functional components that perform a variety of operations. Portions 251, 252 and 253 can be configured in a variety of granularity (e.g., cores, partition, logic blocks, components, transistors, etc.). Sense points 271, 272 and 273 sense the voltage level at the inputs to the portions 251, 252 and 253 respectively. The results of the sensing are forwarded to multi-point sensing combination component 275 which combines the sensing results into a combined multi-point sensing indication 279. It is appreciated that there can be various components (not shown) between the sense points and the power supply VDD.

Figure 2B:
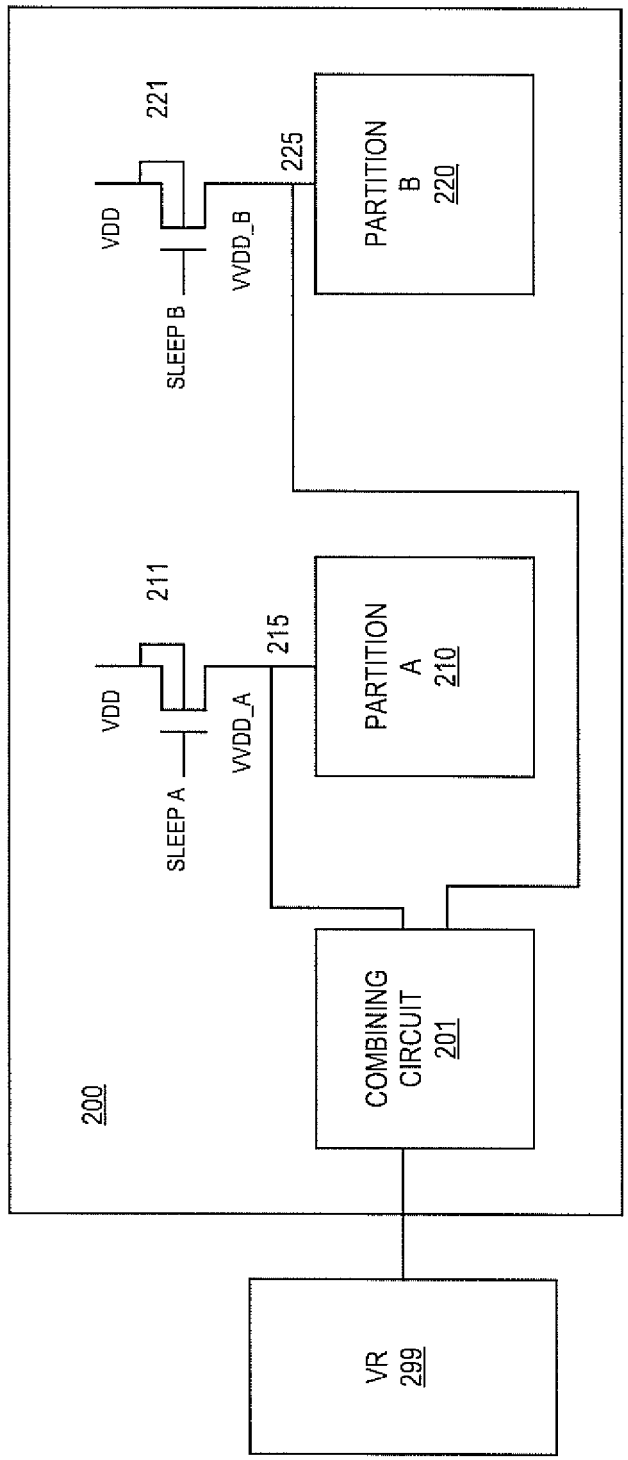
FIG. 2B is a block diagram of an exemplary multiple point voltage sensing system with power gating in accordance with one embodiment of the present invention.

FIG. 2B is a block diagram of an exemplary multiple point voltage sensing system 200 with power gating in accordance with one embodiment of the present invention. Multiple point voltage sensing system 200 includes combining circuit 201, partition 210, power gate 211, partition 220 and power gate 221. Partition 210 is coupled to power gate 211 and partition 220 is coupled to power gate 221. The output of power gate 211 and 221 are coupled to combining circuit 201.

Figure 2C:
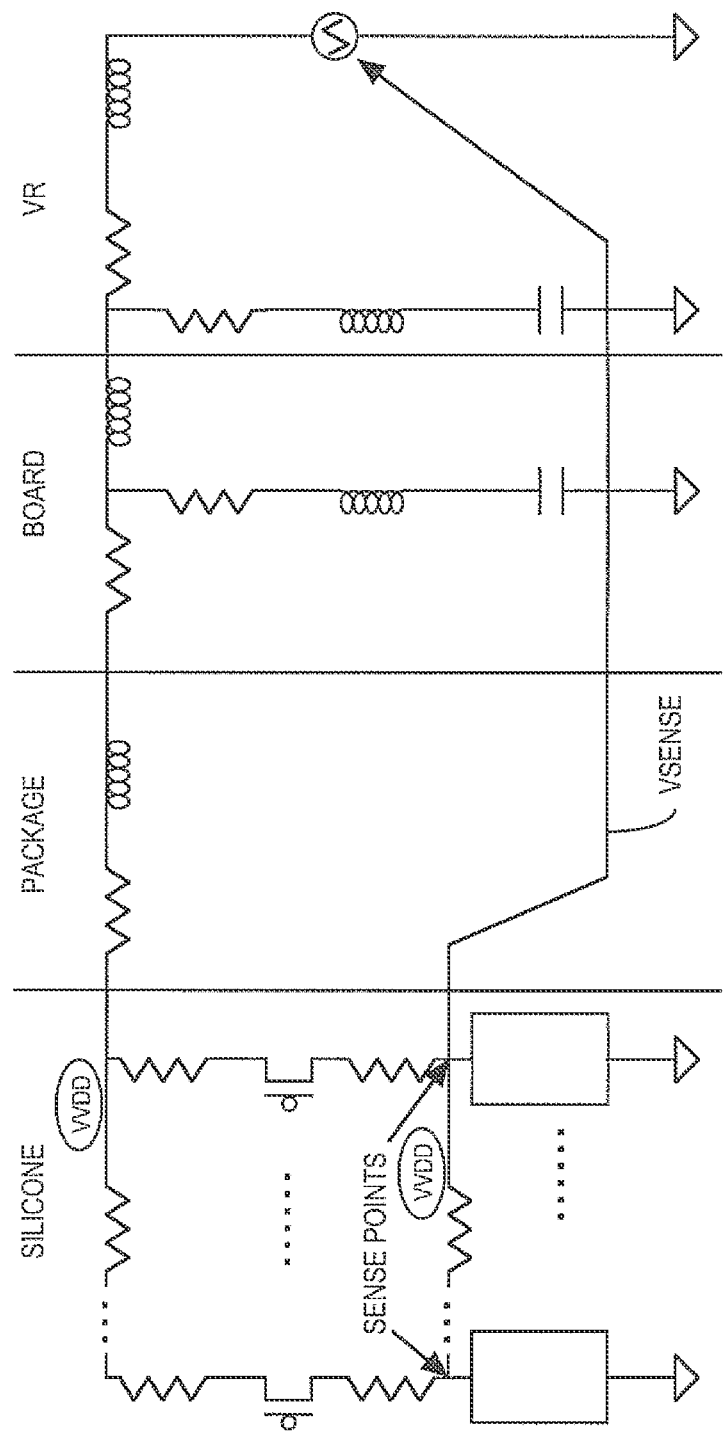
FIG. 2C is a another exemplary schematic illustration of exemplary multiple point voltage sensing system in accordance with one embodiment of the present invention.

The components of multiple point voltage sensing system 200 cooperatively operate to perform voltage sensing. Partitions 210 and 220 include functional components that perform a variety of functions. Power gates 211 and 221 control power supply to partitions 210 and 220 respectively. Outputs of power gates 211 and 221 at sense points or components 215 and 225 are forwarded to combining component 201 which forwards a combined result to voltage regulator 299. FIG. 2C is a schematic another illustration of an exemplary multiple point voltage sensing system in accordance with one embodiment of the present invention.

Many disadvantages of a conventional single point voltage sensing can be overcome by the multi-point sensing scheme presented herein. In one embodiment, the multi-point sensing is done by placing multiple sense points across the partition/silicon and merging the sense traces from each sense point with balanced routing and can be similar to a resistor averaging network. Using multiple sense points at different locations can result in the averaging of transistor activity across different points on die. Thus, the resulting voltage sense feedback can be an average for various use-cases if enough sense locations are used. So in most use-cases, voltages at most locations on die are within $+/-V_{DC\_VAR}/2$ of the average sense voltage. This can be the "ideal" scenario described above and will result in lesser voltage noise specification ($V_{DC\_VAR}$). Thus, multi-point sensing can reduce $V_{DC\_VAR}$ and improve performance.

Figure 3:
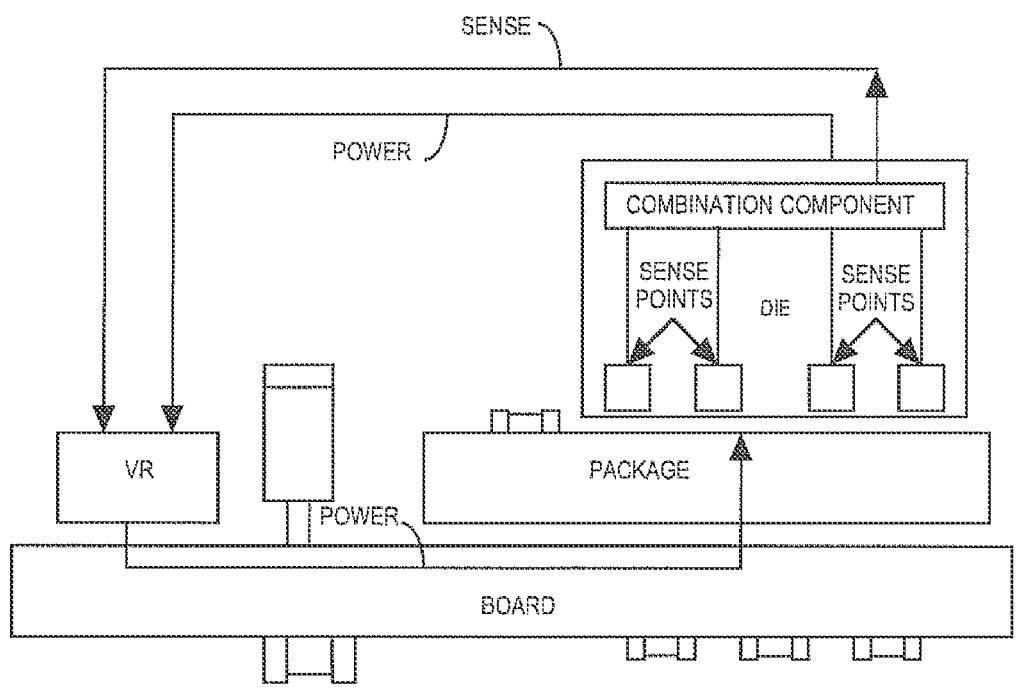
FIG. 3 is a block diagram depicting one embodiment of an exemplary simplified electrical model for the power delivery system.

FIG. 3 is a block diagram depicting one embodiment of an exemplary simplified electrical model for the power delivery system. As indicated in FIG. 3, there are multiple sense points included in the die. Note that the closer the sense point is to the transistor on die, the more accurate is the programmed voltage on the switching transistor. Reducing the uncertainty in voltage at the transistor can reduce the voltage margin needed and hence reduces power consumed by the system. Hence, in one embodiment the desire is to have the sense point as close to the switching transistor as possible.

It is appreciated that a sense point can also be included in various locations in a die (e.g., on silicon top layer metal, on silicon lower layer metal, (e.g., such as M1, etc.). It is also appreciated that there can also be other sense points locate at other locations off the die. In one embodiment, in addition to multiple sense points on a die there can be sense points on the board, in the package ball grid array (BGA) area.

There are often several issues or problems with traditional voltage sensing scheme attempts that are reduced or overcome by the presented multiple point systems and methods. One issue includes unpredictability of the "ideal" sense point. Conventional voltage sensing schemes often attempt to ensure that the sense point location is set to the desired voltage $V_{NOM}$. However, there are voltage variations across the silicon which often make transistors away from the sense point see a different voltage than $V_{NOM}$. A partial list of possible reasons for the voltage variation can include:

1. Transistor activity variations across the silicon at different use-cases;
2. Power grid design variations across the silicon;
3. Spatially discrete bump power delivery; and
4. Package power spatial power distribution is not uniform.

In one embodiment, the voltage noise specification ($V_{DC\_VAR}$) sets the maximum DC voltage variation across the silicon. If a single sense point is used, in one exemplary implementation a location close to an "ideal " may be to choose a location with an average voltage such that half of the points are at $+V_{DC\_VAR}/2$ higher than the sense point and the other half points are at $V_{DC\_VAR}/2$ lower than the sense point. However, it is often very hard to determine a location for the sense point that will meet the above criteria in most or all conditions. Of the possible reasons for DC variation listed above, the transistor activity variation is usually the toughest to predict and design for. There could be different scenarios where the single sense point either has the highest activity on die (and there is a location with voltage+ $V_{DC\_VAR}$) or lowest activity on die (and there is a location on die with $-V_{DC\_VAR}$). To cover both the scenarios mentioned before, in one embodiment the specification for $V_{DC\_VAR}$ is increased to $2*V_{DC\_VAR}$. This can result in higher voltage margin and hence lower performance.

Figure 4:
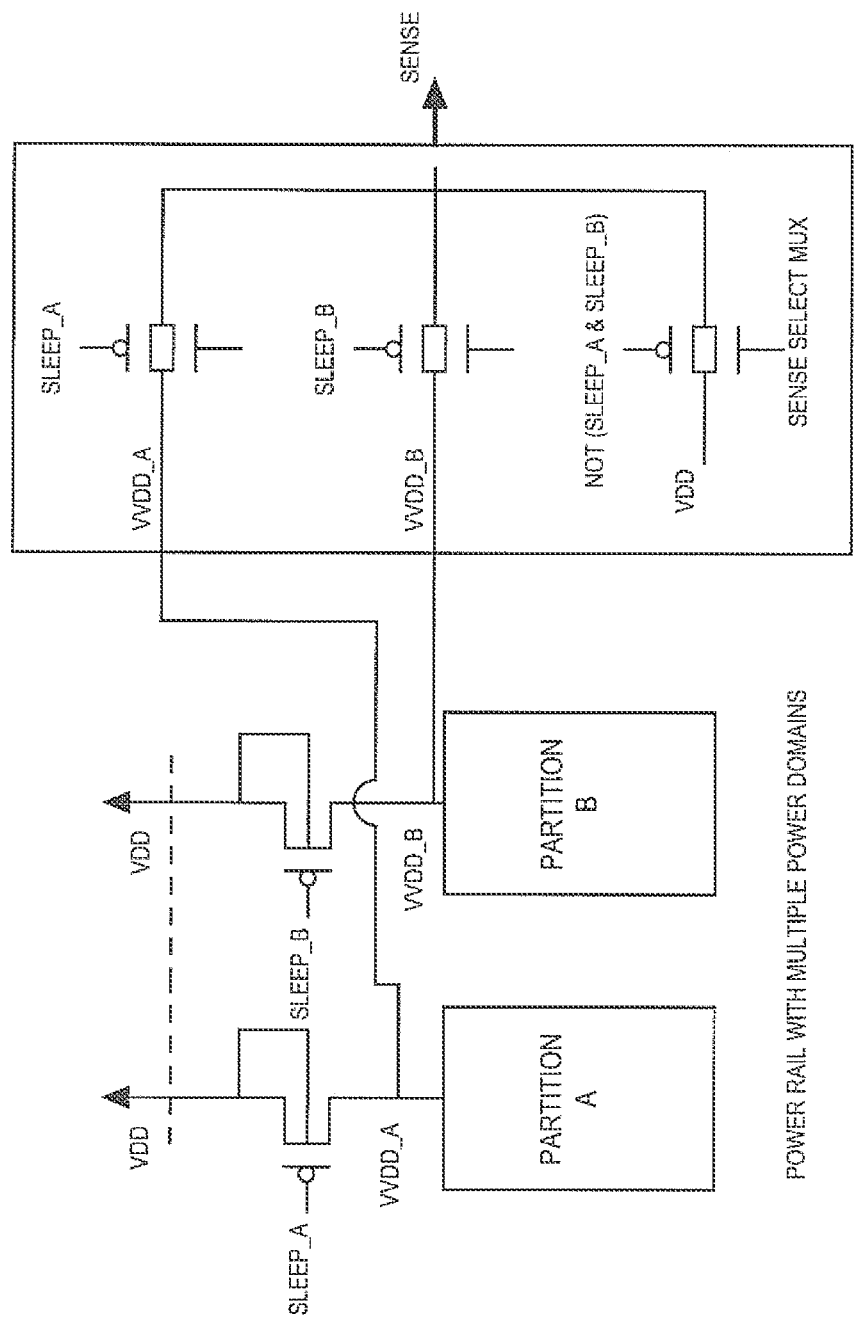
FIG. 4 shows a block diagram of an exemplary implementation power gated partition with un-gated supply VDD and virtual/gated supply VVDD in accordance with one embodiment of the present invention.

In one embodiment, power gating is a technique where regions/domains of die components are cutoff from an exemplary power supply through sleep transistors or power gates. FIG. 4 shows a block diagram of one exemplary implementation power gated partition with un-gated supply VDD and virtual/gated supply VVDD. There is voltage drop across the power gates $V_{IR\_PG}$ as shown. In one exemplary implementation, there are two possible locations for voltage sensing: VDD or VVDD. One advantage of VVDD sensing is that it can sense the voltage closer to the switching transistor and hence improve performance as stated earlier. Note, in the present example the $V_{IR\_PG}$ is a function of the current drawn by the partition and hence not a constant. In one exemplary implementation, sensing at VVDD can also reduce the uncertainty in voltage at the switching transistors, thereby also reducing voltage margin and improving power.

However, one issue with VVDD sensing in a conventional approach can be that when the partition is power gated, the voltage on VVDD is floating and unpredictable. This can make the voltage feedback to regulator floating, which can be unacceptable. Hence, in one embodiment, VVDD sensing is not used unless there is a feedback that is driven and does not float.

In one embodiment, multi-point sensing on VVDD domain is a more complex scenario as power gating is involved and more control signals are included for continuous feedback to the VR. In one exemplary implementation, the logical for a VVDD multi-point sensing scheme can be:
1. When all domains are active, sense feedback should be average of all domains.
2. When any domain is power gated, it should be removed from the sense's feedback loop.
3. When all domains are power gated, feedback is provided from the ungated/real VDD.

In one embodiment, the logical criteria described above is achieved through the use of a special cell called "Sense Select MUX". A block diagram schematic of one embodiment of an exemplary Sense Select MUX is shown in FIG. 4.

FIG. 4 is a schematic showing an exemplary power rail with multiple power gated domains and the Sense Select MUX design in accordance with one embodiment of the present invention. Consider the two independently power gated partitions A and B as shown in FIG. 4. The power gating of the partitions are controlled by Sleep_A and Sleep_B signals as shown. The VVDD sense probes from each of the domains can be routed to the sense select MUX as shown in FIG. 4. In one exemplary implementation, the sense select MUX is a pass-gate MUX controlled by the same sleep signals as the partitions. The truth table for the sense select MUX shown in FIG. 4 is given in Table below:

TABLE 1

Truth table for the Sense Select MUX design shown in FIG. 4.

| Sleep_A | Sleep_B | Sense |
|---------|---------|-------|
| 0 | 0 | Avg(VVDD_A, VVDD_B) |
| 0 | 1 | VVDD_A |
| 1 | 0 | VVDD_B |
| 1 | 1 | VDD |

The sense select MUX will select the average of the non-power gated partitions at any time and when all partitions are power gated, it can select the real/un-gated VDD to provide the voltage feedback. Thus, in one embodiment, the proposed invention can guarantee that the feedback to the regulator is non-floating at all times. The truth table in Table-1 can be readily extended to a system with any number of power gated domains as long as they are controlled by unique sleep signals.

Figure 1:
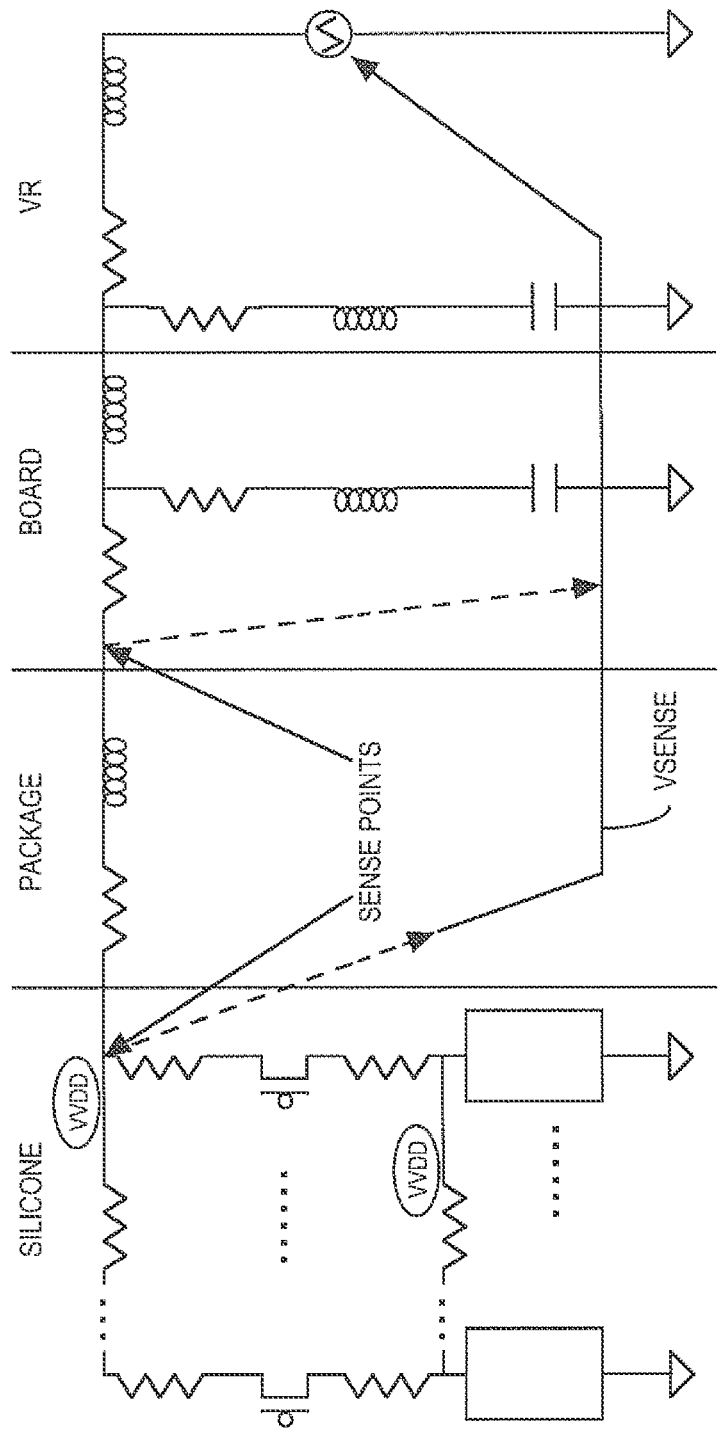
FIG. 1 is a block diagram of an exemplary conventional power delivery system.

With reference back to FIG. 1, it is appreciated that the multi-point combination can be combined multipoint sensing result in a variety of ways. In one embodiment, the multi-point combination can include averaging (e.g., selective averaging, complete averaging, weighted averaging, etc.) of the sensed voltages. The combined multi-point sensing combination can include compensations for a variety of conditions (e.g., location, powergated performance, application, etc.). In one exemplary implementation, powergated (power off) portions are not included in the average. In one exemplary implementation, sensed voltages associated with a portions performing particular operations are weighted differently (e.g. more critical or important functions are weighted more than less others, portions associated with different applications are weighted differently, etc.).

Figure 5:
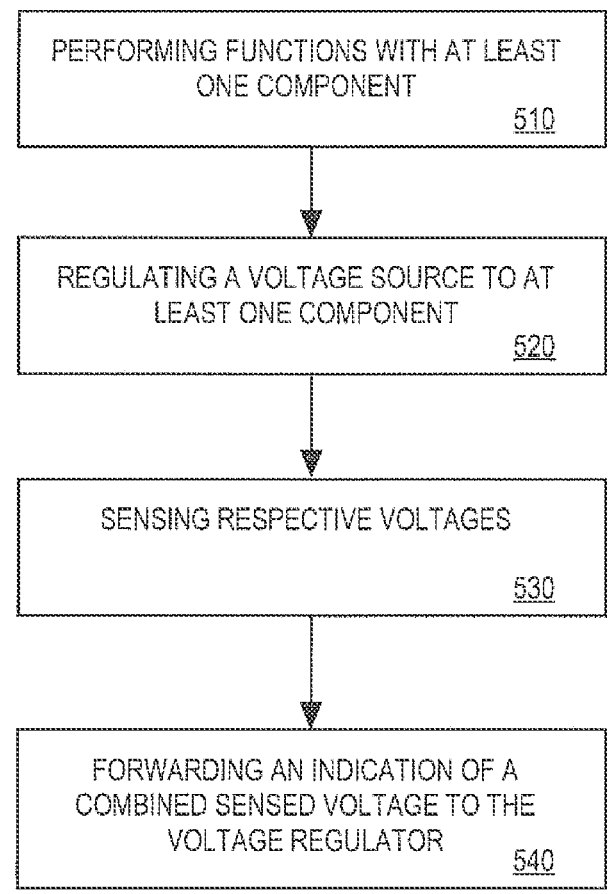
FIG. 5 is a block diagram of an exemplary method in accordance with one embodiment of the present invention.

FIG. 5 is a block diagram of an exemplary method 500 in accordance with one embodiment of the present invention.

In block 510, functions are performed with at least one component. It is appreciated that a variety of functions can be performed.

In block 520, a voltage source to a plurality of components is regulated. In one embodiment the voltage source to the component is regulated in accordance with a sensed voltage.

In block 530, respective voltages of the plurality of components are sensed. In one embodiment, at least one of the plurality of sensed voltages is on the downstream side of a power gate component.

In block 540, an indication of combined sensed voltage are forwarded to the voltage regulator. In one embodiment at least one of the sensed voltages is on the downstream side of a power gate component. In one embodiment an indication of a voltage sensed by the voltage sensing on the downstream side of the power gate is not combined with indications of sensed voltages of another of the plurality of voltage sensing components. The indication of the combined sensed voltages can include an average. In one embodiment, a sensed voltage associated with a functional component that is power gated off is removed from the combining. In one exemplary implementation, when all sensed voltages are associated with functional components that are power gated on an ungated sensed voltage is used.

The disadvantages of a single point voltage sensing can be overcome by the proposed multi-point sensing scheme. Multi-point sensing is the scheme where voltage feedback from Silicon to the voltage regulator is an average from multiple points on the die. In the current proposal, multi-point sensing is done by placing multiple sense points across the die partitions/silicon and merging the sense traces from each sense point with balanced routing. In one exemplary implementation, this is similar to a resistor averaging network. In one embodiment, using multiple sense points at different locations results in the averaging of transistor activity across different points on die. Thus, the resulting voltage sense feedback is an average for multiple use-cases if enough sense locations are used. So in most use-cases, voltages at locations on die are within $+/-V_{DC\_VAR}/2$ of the average sense voltage. This can approximate an the "ideal" scenario (e.g., described above, etc.) and result in lesser $V_{DC\_VAR}$. Thus, multi-point sensing can reduce $V_{DC\_VAR}$ and improve performance.

Figure 6:
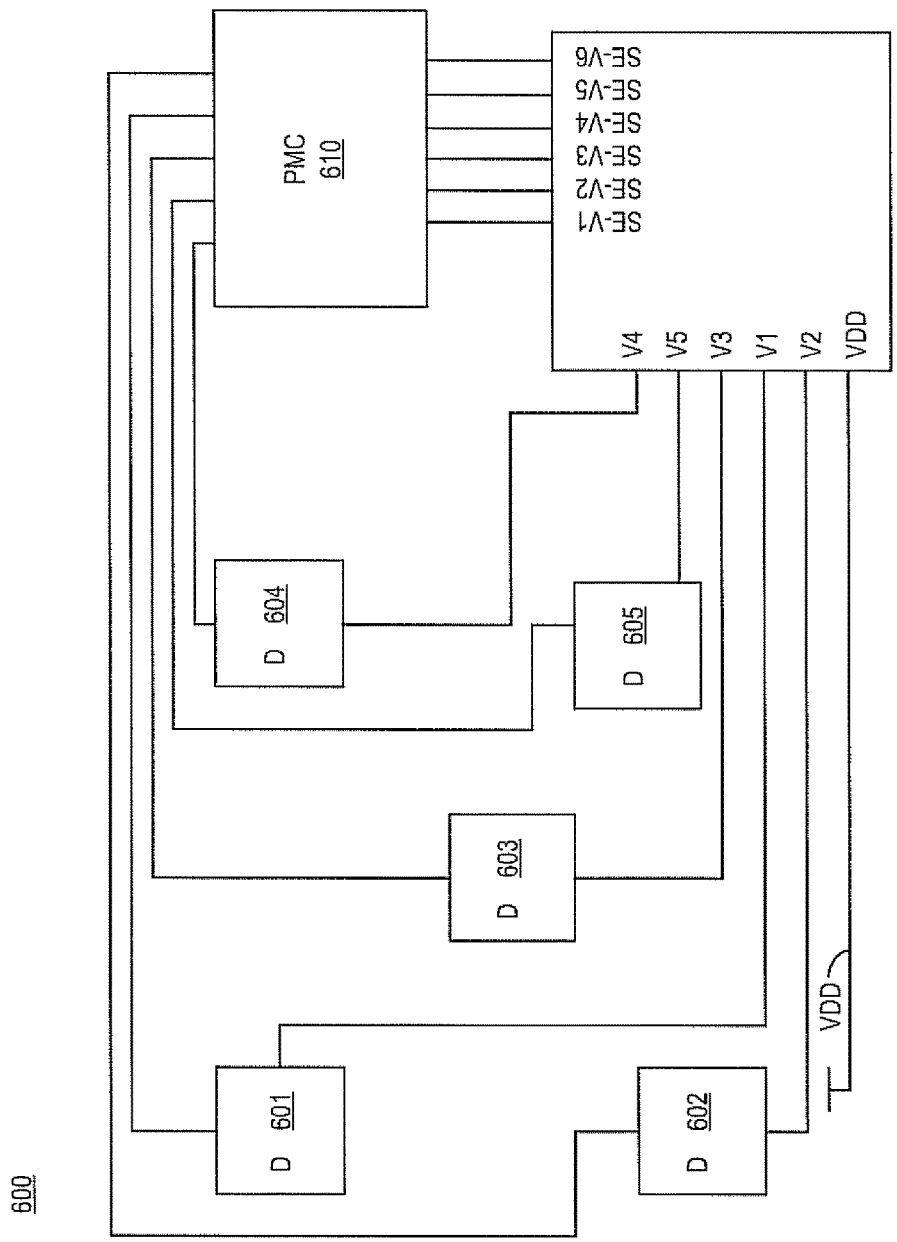
FIG. 6 is a block diagram of an exemplary sensing control signal scheme in accordance with one embodiment of the present invention.

FIG. 6 is a block diagram of exemplary sensing control signal scheme 600 in accordance with one embodiment of the present invention. Sensing control signal scheme 600 includes domains 601, 602, 603, 604, 605, power management controller (PMC) 610 and sense select MUX 620. The combining circuit is a 6 input 1-hot MUX 620 which selects one (or more) of the sensed voltages (e.g., V1, V2, V3, V4, V5, VDD). The 6 input voltages are VDD of each of the 5 power gated partitions and the real VDD. In one exemplary implementation, the MUX selects sensed voltage indications of the power gated partitions that are power ungated (powered on). The selection of the sensed voltage indications is made in accordance with the control directions (e.g., SE-V1, SE-V2, etc.) from PMC 610. If none of the power gated partitions are power ungated, then real VDD is selected as the sense voltage. In one exemplary implementation, the select MUX control scheme is as follows:

1) Do not select the VVDD of a partition which is power gated (powered off);

2) Select VVDD of the partitions which are power ungated (powered on); and

3) When all partitions are power gated (powered off) select real-VDD.

Thus, the proposed invention has the following advantages over the current single-point VDD sensing scheme. By using multi-point sensing, the need for identifying a single "ideal" sense point is reduced. By using multi-point sensing, the voltage feedback provides combined voltage of different points on die, thereby reducing voltage margin which in turn improves system performance. Through the use of sensed voltage combination (e.g., "Sense select MUX", average voltage, etc.), the present systems and methods can make VVDD sensing possible non-floating feedback. The non-floating feedback can be guaranteed. By sensing VVDD, this scheme can compensate for the voltage drop across the power gate and hence improves system performance.

It is appreciated that the present invention can be implemented in a variety of embodiments. In one exemplary implementation the present invention can be utilized in processing systems utilized to provide a variety of graphics applications including video games. For example, the present invention can be utilized in a game console, personal computer, personal digital assistant, cell phone or any number of platforms for implementing a video game. It is also appreciated that references to video game application implementations are exemplary and the present invention is not limited to these implementations.

Portions of the detailed description are presented and discussed in terms of a method. Although steps and sequencing thereof are disclosed in figures herein describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "processing", "computing", "calculating", "determining", "displaying", "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments may be described in the general context of computer-executable instructions, such as program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A computing device comprising:
   an ungated single phase power supply;
   a plurality of power-gated logic partitions, wherein power to each of the plurality of power-gated logic partitions is associated with a respective one of a plurality of power gates that are configured to be on or off according to respective control signals for each power-gated logic partition;
   a plurality of voltage sensors that measure voltage at respective locations on the computing device and generate a corresponding voltage indication signal representing the measured voltage, wherein the plurality of voltage sensors includes voltage sensors located at each of the plurality of power-gated logic partitions and the ungated single phase power supply; and
   a voltage sensing module coupled to each of the plurality of voltage sensors and configured to regulate voltage on the computing device according to a sensed voltage feedback signal, wherein:
   when at least one of the power gated logic partitions is on, the voltage sensing module is configured to receive the voltage indication signal from each of the plurality of voltage sensors located at the power-gated logic partitions that are on, compute an average of received measured voltage values, and generate the sensed voltage feedback signal as a function of the computed average and when all the power gated logic partitions are off, the voltage sensing module is configured to generate a sensed voltage feedback signal corresponding to the measured voltage at the ungated single phase power supply.

2. The computing device of claim 1 wherein at least one of the plurality of voltage sensors is located on a downstream side of one of the plurality of power gates.

3. The computing device of claim 2 in which an indication of a voltage sensed by the at least one of the plurality of voltage sensors located on the downstream side of one of the plurality of power gates is not combined into the average of the measured voltages at respective power-gated logic partitions that are on.

4. The computing device of claim 1 wherein at least one of the voltage sensors is located on an up stream side of a power gate and at least another one of the voltage sensors is located on the down stream side of the power gate.

5. The computing device of claim 1 wherein the plurality of voltage sensors are included in a voltage feedback loop.

6. The computing device of claim 1 wherein the voltage sensing module is a pass-gate MUX controlled by sleep signals, wherein the sleep signals also control the plurality of power-gated logic partitions.

7. A computing device comprising:
an ungated single phase power supply;
a plurality of power-gated logic partitions that receive power from the ungated single phase power supply via a plurality of respective power control gates, wherein the power control gates are configured to be controlled on or off according to a plurality of respective control signals for the plurality of power-gated logic partitions;
a plurality of voltage sensors that sense voltages at respective locations on the computing device and generate corresponding respective sensed voltage indication signals, wherein at least one of the respective locations correspond to at least one of the plurality the power-gated logic partitions and at least another one of the respective locations corresponds to the ungated single phase power supply; and
a voltage sensing module coupled to each of the plurality of voltage sensors, wherein the voltage sensing module is configured to forward an output indication signal to the ungated single phase power supply, wherein the voltage sensing module is configured to receive the voltage indication signal from each of the plurality of voltage sensors located at the power-gated logic partitions that are on, compute an average of received measured voltage values, and forward the output indication signal to the ungated single phase power supply, wherein the output indication signal conveys a single value that is a function of a computed average of the sensed voltage indication signals from the respective plurality of voltage sensors at an instance in time.

8. The method of claim 7 wherein at least one of the plurality of voltage sensors is located on a downstream side of at least one of the plurality of respective power control gates.

9. The method of claim 8 in which an indication of at least one of the plurality of voltage sensors is located on a downstream side of at least one of the plurality of respective power control gates is not combined into the average with indications of sensed voltages, wherein the at least one of the plurality of respective power control gates is in a selective off configuration.

10. The method of claim 7 wherein at least one of the plurality of voltage sensors is located on an upstream side of at least one of the plurality of respective power control gates.

11. The system of claim 7 wherein the voltage sensing module is a pass-gate MUX controlled by sleep signals, wherein the sleep signals also control the plurality of power-gated logic partitions.

* * * * *